June 21, 1932. V. W. BUSCH 1,864,230
BIRD CAGE BATH
Filed Dec. 12, 1931
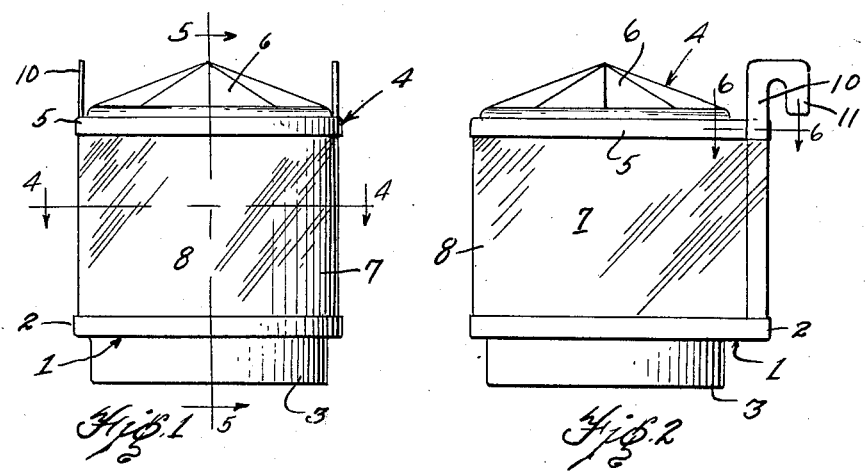
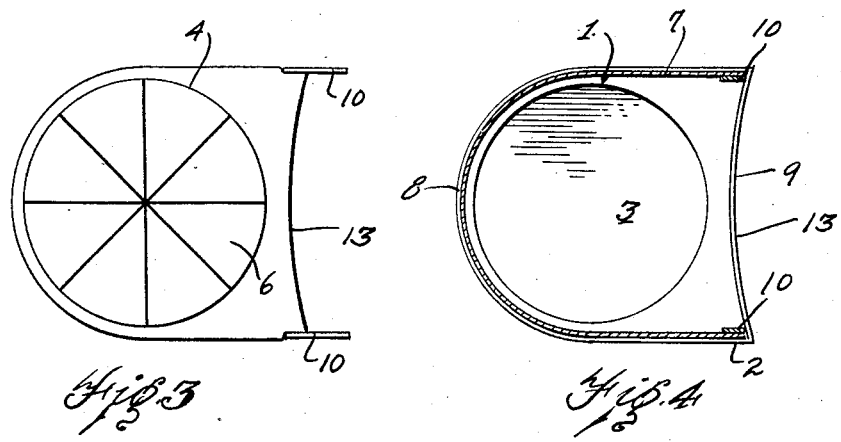
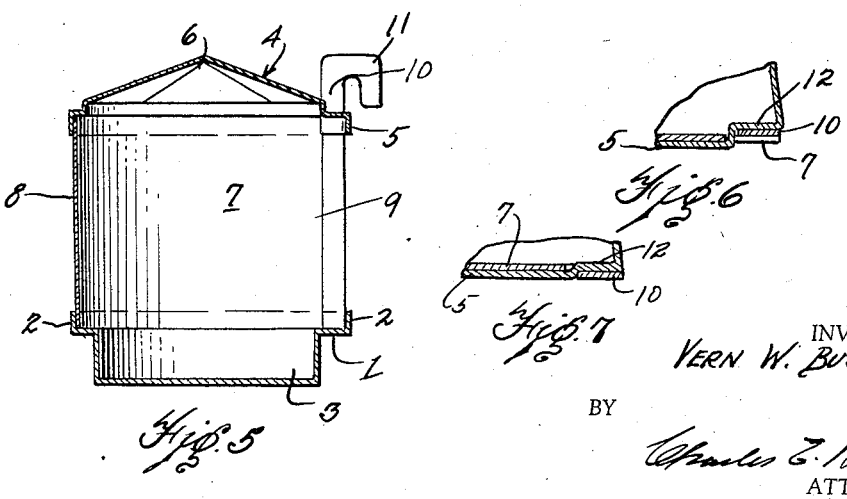
INVENTOR.
VERN W. BUSCH
BY
Charles E. Brown
ATTORNEY.

Patented June 21, 1932

1,864,230

UNITED STATES PATENT OFFICE

VERN W. BUSCH, OF DETROIT, MICHIGAN, ASSIGNOR TO BUSCH MANUFACTURING COMPANY, OF DETROIT, MICHIGAN, A CORPORATION OF MICHIGAN

BIRD CAGE BATH

Application filed December 12, 1931. Serial No. 580,630.

This invention relates to bird baths for bird cages and an object of the invention is to provide a device of this character constructed entirely of celluloid or the like thereby providing an extremely light weight structure and which is provided with a pair of hooks for securing the bath to a bird cage adjacent the door opening therein.

Another object of the invention is in the provision of a device of this character which comprises a base, a top, a body member extending between the base and the top and of substantially U shape in horizontal cross section, and a pair of strips glued or cementitiously secured, one to each rear edge of the body portion to provide a stiffener for the same and the upper edge of each strip formed in the shape of a hook to provide means for securing the bath to the bird cage.

A still further object of the invention is in the provision of a bird bath which is extremely cheap to manufacture and assemble and which is of rigid construction, while being extremely light in weight.

These objects and the several novel features of the invention are hereinafter more fully described and claimed and the preferred form of construction by which these objects are attained is shown in the accompanying drawing in which—

Fig. 1 is a front elevational view of the device.

Fig. 2 is a side elevation thereof.

Fig. 3 is a top plan view.

Fig. 4 is a section taken on line 4—4 of Fig. 1.

Fig. 5 is a section taken on line 5—5 of Fig. 1.

Fig. 6 is a detail section taken on line 6—6 of Fig. 2.

Fig. 7 is a similar section showing an alternative form of construction.

Referring to the drawing, the device comprises the base 1 formed with the peripheral upstanding flange 2 and the circular depressed portion 3 which may be filled with water for the bird to bathe in. The top 4 is formed with the peripheral downturned flange 5 and preferably with a conical portion 6. The body portion 7 is rounded at the front at 8 and is open at 9 for permitting the bird to enter the water in the portion 3. The lowermost edge of the body portion 7 fits within the upstanding flange 2 of the base 1 and is glued or cementitiously secured thereto. The upper edge fits within the downturned flange 5 of the top 6 and is likewise glued or cemented thereto. The portion 7 therefore in my improved construction provides the principal means for securing the top and base in fixed relation.

It will be understood that the base 1, the top 4 and the body portion 7 are preferably made of celluloid or the like thereby providing an extremely light weight structure and the body portion 7 is preferably transparent while the base and the top are preferably opaque.

The strips 10 extend from the base 2 to a point above the flange 5 on the top 4 and are each provided with a hooked end 11 for securing the bath to the bird cage so that the open end 9 of the bath aligns with the door opening in the cage. Each strip 10 is preferably glued or cementitiously secured to one edge of the body portion 7 thereby providing a stiffener for the open end of the body portion. By referring to Fig. 6, it will be seen that the flange 5 on the top 4 is offset at 12 an amount equal to the combined thickness of the strip 10 and the body portion 7 to prevent the necessity of cutting or notching the top 4 to permit the strips 10 to pass thereby. It will thus be seen that since the body portion is glued or cementitiously secured to both the top and the base no additional stiffeners are needed except those at the free end of the body portion. The top 4 and the base 1 are each curved at 13 to closely conform to the shape of the cage to which the bath is attached.

Referring to Fig. 7 the strip 10 is positioned on the outside of the body portion 7 thereby making the offset portion 12 of less depth than that shown in Fig. 6.

From the foregoing description it becomes evident that I have provided a bird bath which is extremely light in weight and which is cheap to manufacture and assemble.

While I have described my invention as adaptable for use as a bird bath it is to be understood that the construction set forth in the appended claims may be used in conjunction with a bird cage for other purposes without departing from the spirit and scope of my invention.

Having thus fully described my invention, its utility and mode of operation, what I claim and desire to secure by Letters Patent of the United States is—

1. In a bird bath, a base formed with a depressed portion for receiving water and having an upstanding peripheral flange, a top having a peripheral downturned flange, a transparent body portion substantially U shaped in plan having the top and bottom edges thereof secured to the respective flanges of the top and base providing the principal means for securing the said top and base in fixed relation, and a supporting means therefor consisting of a pair of strips each having its upper end return-bent and the body thereof cementitiously united with the respective vertical edge of the body member to reinforce the same between the flanges of the top and the base.

2. In a bird bath, a base having an outline in plan view corresponding to the shape of a U, said base further being formed with a depressed portion and having an upstanding peripheral flange, a top similar in outline and having a downturned peripheral flange, a body portion formed of a sheet of transparent celluloid having the shape of a U in plan, the upper and lower edges thereof engaging respectively within the flanges of the top and bottom and cementitiously united thereto providing the principal means for securing the said top and base in spaced relation, and a supporting means for the said bath consisting of a flat strip of celluloid cementitiously united with each vertical edge of the body member and providing therewith an edge of double thickness, said strips being provided with hook shaped end portions for the purpose described.

3. In a bird bath, a base formed of celluloid having a central depressed portion for receiving water and having an outline in plan corresponding to the shape of a U, a top formed of celluloid and having similar form in plan view, a transparent body portion formed of a sheet of celluloid having the shape of a U in plan and the upper and lower edges thereof being respectively cementitiously united with the top and the base, a strip of celluloid cementitiously secured to each vertical edge of the body and forming therewith a portion of double thickness of celluloid between the top and the base, said strips each having a hook like portion thereon for the purpose described.

4. In a bird bath, a celluloid base formed with an upstanding peripheral flange, a celluloid top having a downturned peripheral flange, a transparent body portion of celluloid having the top and bottom edges thereof secured to the respective flanges of the top and base and providing the principal means for securing the same in a fixed relation, said body portion being provided with an opening to the interior of the device, and means for detachably securing the same to a bird cage including a hook member attached to the structure.

5. In a bird bath, a celluloid base having a central depressed portion providing a receptacle and further having an upturned peripheral flange, a celluloid top having a downturned peripheral flange, a transparent body portion of celluloid substantially U shaped in plan view having the top and bottom edges thereof cementitiously secured to the respective flanges of the top and base providing the principal means for securing the said top and base in fixed relation, a strip of celluloid secured to the respective vertical edges of the U shaped body portion to reinforce the same, and means for detachably securing the same to a bird cage.

In testimony whereof I sign this specification.

VERN W. BUSCH.